United States Patent [19]

Carena et al.

[11] Patent Number: 4,536,650
[45] Date of Patent: Aug. 20, 1985

[54] OPTICAL TRANSDUCER WITH A TRANSPARENT SHUTTER DISK

[75] Inventors: Ugo Carena, Ivrea; Paolo Rivera, Strambino, both of Italy

[73] Assignee: Ing. C. Olivetti & C., S.p.A., Ivrea, Italy

[21] Appl. No.: 461,137

[22] Filed: Jan. 26, 1983

[51] Int. Cl.³ .............................................. G01D 5/34
[52] U.S. Cl. ............................ 250/231 SE; 250/237 G
[58] Field of Search ............... 340/347 P; 250/237 G, 250/231 SE, 578, 211; 356/395

[56] References Cited

U.S. PATENT DOCUMENTS 3,714,491  1/1973  McIntyre et al. ................... 250/211
4,221,963  9/1980  Fushimi ........................... 250/237 G
4,436,398  3/1984  Endo et al. ....................... 250/237 G Primary Examiner—David C. Nelms
Assistant Examiner—J. Jon Brophy
Attorney, Agent, or Firm—Banner, Birch, McKie & Beckett

[57] ABSTRACT

An optical transducer for detecting the angular position of a rotary member with respect to a fixed structure, which comprises a shutter disc of transparent material, having two faces which are parallel to each other. The disc is provided with a plurality of radial shutter elements, spaced by elements which transmit the light. The shutter elements are formed by V-shaped elements provided on one face of the disc and capable of totally deflecting the light incident thereon.

6 Claims, 3 Drawing Figures

OPTICAL TRANSDUCER WITH A TRANSPARENT SHUTTER DISK

BACKGROUND OF THE INVENTION

The present invention relates to an optical transducer, which may be mentioned by way of example in relation to the shaft of a motor which provides for selection of the characters of a character-carrying element of an office typewriter or which produces movement of the character-carrying element with respect to a printing line. In this type of transducer, the movable member unambiguously determines the relative position as between the shutter member and the assembly formed by the light source and the photodetector, and causes illumination of the photodetector, which varies in dependence on the movement of the movable member. In response to illumination thereof, the photodetector in turn produces a signal which indicates the position of the movable member. In order to have sufficiently accurate information, the output signal must have a fairly high level and thus dimensions of the photodetector cannot be too small. Moreover any variations in response by the photodetector are detected as variations in the position of the movable member, so that the accuracy of the transducer directly depends on the stability of the photodetector and the illuminating means in regard to external disturbances or variation in time in respect of the characteristics of the various electrical-optical components.

A position transducer is known which comprises a shutter member in the form of a disc which has apertures or notches at its periphery and which is connected to a rotary member, a photodiode which illuminates a notched sector of the disc, and a mask provided with four regions which are provided with a series of apertures or notches corresponding to those of the disc. The apertures or notches of the four regions are out of phase relative to each other by a quarter of a pitch and selectively transmit the light from the apertures or notches of the disc to four photosensitive elements. The output signals of the photosensitive elements are used, in pairs in phase opposition, to produce two positional signals which in turn are out-of-phase by a quarter of a cycle. A part of the light emitted by the photodiode which passes by the periphery of the disc is detected by a further photodetector which provides pilot control for a circuit for stabilising the photodiode itself. Such a transducer has been found to be fairly accurate. However, during production and depending on the characteristics of the individual components, the transducer requires accurate and expensive individual calibration of the circuits associated therewith for adjusting the signals of the photodetectors to the level envisaged by the design. In the course of service moreover, the variations in distribution of the light flux or the variations in characteristics of any of the five sensitive elements which are disposed on various areas of the cone of illumination of the photodiode give rise to a positional error which cannot be corrected except by replacing the entire transducer.

SUMMARY OF THE INVENTION

The object of the present invention is to provide a simple and economical transducer which provides positional information which is subjected to the minimum influence of the electrical-optical characteristics of the components employed.

In accordance with a feature of the invention, the optical transducer according to the invention is characterised by a shutter disc of transparent plastic material in which the shutter elements are formed by radial V-shaped elements which are disposed on a front surface of the disc and which are capable of totally diverting the light incident thereon.

These and other features of the invention will be clearly apparent from the following description of a preferred embodiment given by way of non-limiting example, with reference to the accompanying drawings.

DETAILED DESCRIPTION OF A PREFERRED EMBODIMENT

Figure 1:
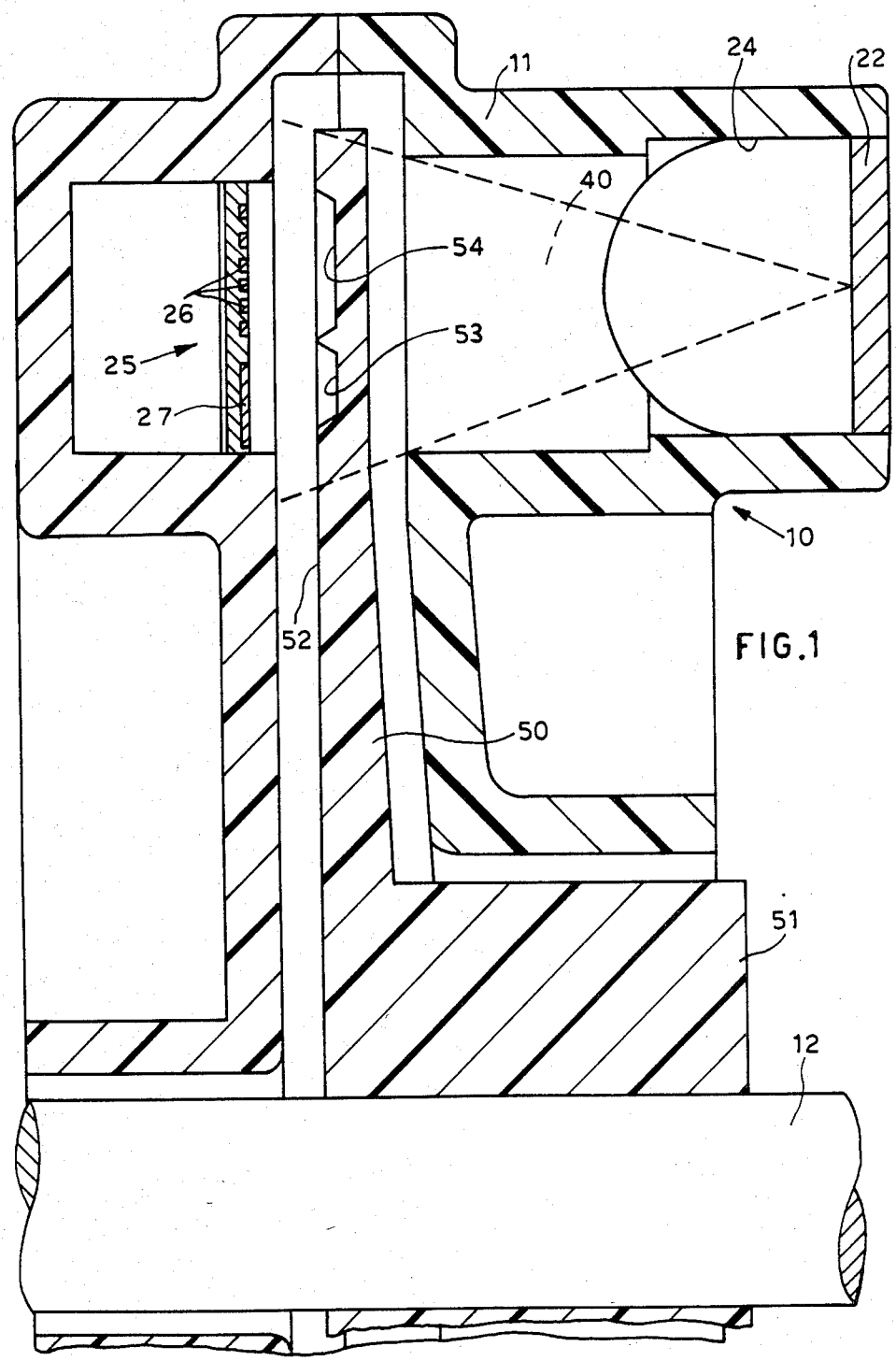
FIG. 1 is a view in cross section of part of an optical transducer according to the invention.

Referring to FIG. 1, an optical transducer 10 according to the invention comprises a casing 11 for example of opaque material, which is of substantially parallelepiped shape, with a shaft 12 disposed rotatably therewithin. An optical transducer 10 of this type is detailed described in the U.S. Patent No. 4,496,835 issued on January 29, 1985 and assigned to the same assignee of the present application. In particular the casing 11 comprises a housing portion 24, in which is lodged a light source 22 formed for example by a photodiode.

Disposed opposite to the light source 22 and supported by the casing 11 is a light detector 25 which is formed by a plurality of photovoltaic cells 26 and a single photovoltaic cell 27.

The transducer 10 further comprises a shutter disc 50 of transparent plastic material, for example polymethylmethacrylate, which is fixed to the rotary shaft 12. On a front surface 52, and along a substantially peripheral circular ring configuration 97 (FIG. 2), the disc 50 comprises one hundred radial recesses 54 which are of a V-shape and which each have an apex angle $\alpha$ of 90° (see FIG. 3). The angle $\alpha$ is selected in consideration of the refractive index of the material used for making the disc 50 and of the element in which the disc rotates, which is normally but not necessarily air. By way of example, if the disc 50 is of plastic material or glass, the angle $\alpha$ is less than 105°. The recesses 54 are at equal angular spacings from each other, have a mean width of about 0.5 mm, which is equal to half the pitch, and are such as to define spaced, transparent smooth surfaces or regions 55 therebetween.

Figure 2:
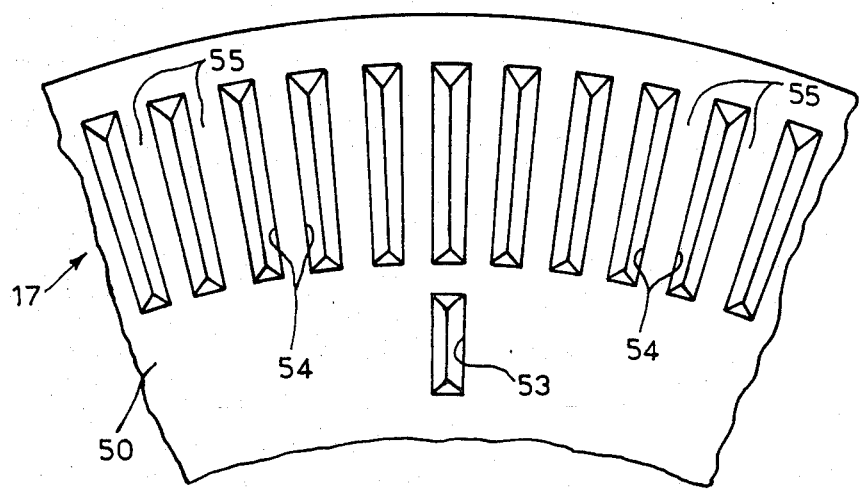
FIG. 2 is a detail on an enlarged scale of the disc included in the transducer shown in FIG. 1.

Also disposed on the front surface 52 of the disc 50 is a single radial recess 53 (see FIG. 2). The recess 53 is also of a V-shape, with an apex angle of 90°, and performs the function of a synchronisation element. The recesses 54 and 53 operate as shutter elements for entirely reflecting or transmitting the light rays 40 (see FIG. 1) which impinge on the disc from the non-recessed part. More particularly, the rays which encounter a transparent region 55 pass therethrough, without being diverted, the angle of incidence between their path and the plane of the surface 52 being 90°. In contrast, the rays which arrive at the inside surfaces 56 and 57 of each recess 53 and 54 are totally deflected and reflected, the angle of incidence between the path thereof and the plane of the surfaces 56 and 57 being 45°. In order for that to take place, the surface 52, 56 and 57 must be perfectly transparent and clear. This can be easily and economically achieved during the phase of moulding the disc 50, without the necessity for additional operations. The radial recesses 53 and 54 are also formed during the operation of moulding the disc 50.

The shutter elements, rather than being formed by V-shaped recesses may be formed by cuneiform raised portions or points, with an internal apex angle less than the limit angle α.

Figure 3:
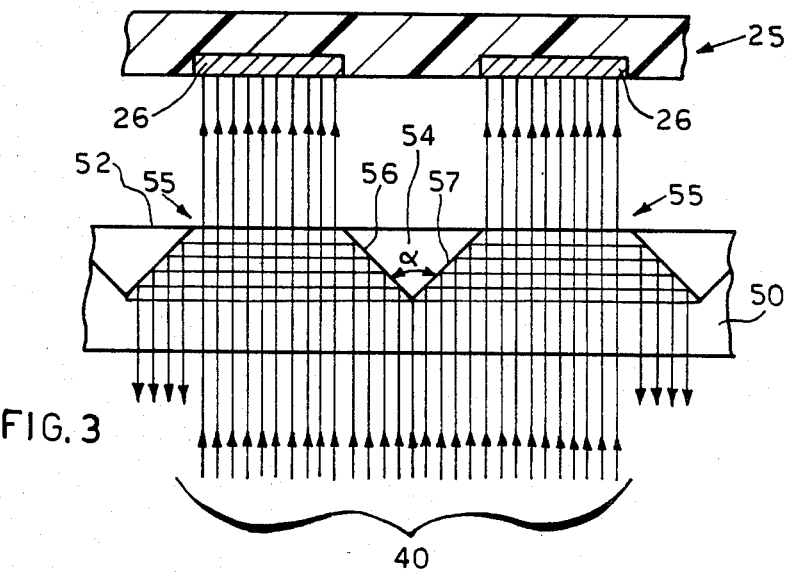
FIG. 3 is a view on an enlarged scale and in section taken of the disc shown in FIG. 2.

Finally, it should be noted that the shutter elements 53 and 54 may be provided either on the front surface of the disc 50 which is towards the light emitting means or on the opposite face, as illustrated in FIG. 3.

What we claim is:

1. An optical transducer for detecting the position of a movable member with respect to a fixed structure comprising a light source for generating a light beam, a photodetector for receiving said light beam, and a shutter member disposed between said light source and said photodetector, said shutter member having two faces which are parallel to each other, at least one of said two faces being provided with a plurality of light interrupting means for interrupting said light beam, separated by a plurality of light transmitting means which selectively transmit said light beam to said photodetector in response to the movement of said movable member, each one of said light transmitting means having a predetermined light transmitting area, wherein said photodetector comprises a plurality of photosensitive elements each one having a photosensitive area which is smaller than the light transmitting area of each one of said transmitting means, wherein said photosensitive elements are diffusely distributed over the region illuminated by said light beam which passes through said transmitting means, and wherein said interrupting means comprises a plurality of V-shaped elements provided on said at least one face of said shutter element and capable of totally deflecting the light incident thereon.

2. An optical transducer according to claim 1, wherein said V-shape elements are recesses.

3. An optical transducer according to claim 1, wherein said shutter member is of transparent plastic material, wherein each one of said V-shaped elements comprises two lateral surfaces forming an apex angle, and wherein said apex angle is less than 105°.

4. An optical transducer according to claim 3, wherein said two faces of said shutter member and said lateral surfaces of said V-shaped elements are smooth.

5. An optical transducer according to claim 1, wherein said movable member comprises a rotatable shaft, wherein said fixed structure comprises a casing on which is rotatably mounted said shaft, wherein said photodetector and said light source are mounted in said casing, and wherein said shutter member comprises a disc connected to said rotatable shaft.

6. An optical transducer according to claim 5, wherein said plurality of V-shaped elements are radially disposed along a substantially peripheral circular ring configuration.

* * * * *